United States Patent [19]

Lalikos et al.

[11] Patent Number: 4,793,384
[45] Date of Patent: Dec. 27, 1988

[54] SELF-DAMPING CONVOLUTED CONDUIT

[75] Inventors: James M. Lalikos, Springfield; Harold K. Waite, East Longmeadow, both of Mass.

[73] Assignee: Titeflex Corporation, Springfield, Mass.

[21] Appl. No.: 47,508

[22] Filed: May 1, 1987

Related U.S. Application Data

[63] Continuation-in-part of Ser. No. 828,295, Feb. 11, 1986, abandoned.

[51] Int. Cl.⁴ ............................................. F16L 09/14
[52] U.S. Cl. .................................... 138/121; 138/177; 138/178; 138/103; 181/227; 60/322
[58] Field of Search ............... 138/148, 149, 122, 173, 138/121, 103, 177, 178; 181/227, 228, 277, 279, 290, 286, 249, 250; 60/322, 323; 228/145

[56] References Cited

U.S. PATENT DOCUMENTS

| | | | |
|---|---|---|---|
| 72,488 | 12/1867 | Hartley | 138/131 X |
| 507,145 | 10/1893 | Macan | 138/147 |
| 650,290 | 5/1900 | Wirt | 181/207 |
| 1,095,100 | 4/1914 | Fulton | 138/121 X |
| 1,343,236 | 6/1920 | Stukenburg | 138/124 |
| 1,424,057 | 7/1922 | Witzenmann | 138/122 |
| 1,459,487 | 6/1923 | Witzenmann | 138/121 |
| 2,274,519 | 2/1942 | Barrett . | |
| 2,489,277 | 11/1949 | Faralla | 138/121 X |
| 2,622,623 | 12/1952 | Michaudet | 138/122 |
| 2,623,121 | 12/1952 | Loveridge | 333/239 |
| 2,770,313 | 11/1956 | Johnson | 181/227 |
| 2,823,702 | 2/1958 | November | 138/121 |
| 2,890,723 | 6/1959 | Evert | 138/122 |
| 2,913,011 | 11/1959 | Noyes et al. | 138/122 X |
| 2,941,911 | 6/1960 | Kumnick et al. | 181/207 |
| 3,061,039 | 10/1962 | Peters | 138/121 X |
| 3,104,733 | 9/1963 | Ludlow | 181/227 |
| 3,133,612 | 5/1964 | Sailler | 181/227 |
| 3,146,746 | 9/1964 | Dreyer | 228/145 |
| 3,176,790 | 4/1965 | Lentz | 181/227 |
| 3,212,603 | 10/1965 | Walker | 181/250 |
| 3,217,832 | 11/1965 | Whitney | 181/208 |
| 3,234,969 | 2/1966 | DuMont | 138/121 |
| 3,420,553 | 1/1969 | Poxon et al. | 138/121 |
| 3,587,658 | 6/1971 | Giltner | 138/134 X |
| 3,655,010 | 4/1972 | DuBois | 138/173 |
| 3,794,080 | 2/1974 | Huston et al. | 138/121 |
| 3,800,398 | 4/1974 | Harrington, Jr. . | |
| 3,846,202 | 11/1974 | Clarke | 138/129 X |
| 3,857,415 | 12/1974 | Morin et al. | 138/122 |
| 3,860,041 | 1/1975 | Leiter | 138/144 |
| 3,913,623 | 10/1975 | Siegwart | 138/122 |
| 3,913,673 | 10/1975 | Siegwart | 138/122 |
| 3,942,702 | 3/1976 | Dreyer | 228/145 |
| 3,976,578 | 8/1976 | Beane | 138/121 X |
| 4,073,317 | 2/1978 | Ellis | 138/147 |
| 4,091,892 | 5/1978 | Hehmann et al. | 181/286 |
| 4,315,558 | 2/1982 | Katayama | 181/227 |
| 4,336,798 | 6/1982 | Beran | 138/122 |
| 4,410,013 | 10/1983 | Sasaki et al. | 138/149 |
| 4,413,657 | 11/1983 | Sasaki et al. | 181/227 |
| 4,514,245 | 4/1985 | Chabrier | 138/144 X |

FOREIGN PATENT DOCUMENTS

| | | | |
|---|---|---|---|
| 208589 | 12/1956 | Australia | 333/239 |
| 484059 | 4/1976 | Australia . | |
| 0185934 | 7/1986 | European Pat. Off. | 138/173 |
| 2080303 | 11/1971 | France . | |
| 2416414 | 8/1979 | France . | |
| 742529 | 12/1955 | United Kingdom | 181/227 |
| 907095 | 10/1962 | United Kingdom | 138/122 |

*Primary Examiner*—James E. Bryant, III
*Attorney, Agent, or Firm*—Louis Bernat

[57] ABSTRACT

A convoluted conduit is especially well adapted for use in hostile environments subject to vibrations which bring on fatigue failures. To prevent the conduit from having a uniform resonance throughout its length, the convolutions have a variable wall thickness. One way this variable wall thickness may be achieved is by forming the conduit walls by wrapping tape in successive layers to form a multiple layered wall. The width of the tape may be such that each alternate convolution has more layers than its two adjacent neighboring convolutions. Another way of making the conduit is to provide a plurality of coaxially nesting tubes which cooperate to form a wall thickness. Brazing or packing material may be positioned between adjacent layers of tape to seal the conduit and to make the wall behave at that point as a single layer.

12 Claims, 3 Drawing Sheets

SELF-DAMPING CONVOLUTED CONDUIT

This application is a C-I-P of Ser. No. 828,295 filed Feb. 11, 1986, now abandoned.

This invention relates to convoluted flexible pipes, hoses, ducts, conduits, and the like, suitable for use in hostile environments which impose a high fatigue responsive to shock, vibration and the like.

The term "conduit" is generically used herein to refer to almost any kind of device for conducting a fluid, without regard to whether it might be more appropriate to call it a hose, pipe, tube, duct, or the like. The conduit problems outlined below may be illustrated by making a reference to an automotive exhaust system (such as the conduit between an engine exhaust manifold and a catalytic converter). However, the invention is not limited thereto. For example, steam lines, hot air lines, and gaseous fuel lines have many similar problems. Therefore, this reference to automotive exhaust systems is not to be taken as necessarily limiting the invention thereto. Nor, is it limited exclusively to high temperatures or gaseous media. Reference is made to U.S. Pat. No. 4,315,558 and references cited therein for a use of a convoluted conduit in an automobile exhaust system.

An automobile exhaust system is an example of a hostile environment in which the invention might be used. The exhaust is very hot and filled with corrosive gas under pressure. There are substantial vibrations, both rhythmic (such as vibrations caused by the regular rotation and related harmonics of the engine) and random (such as might be caused by the vehicle striking flying rocks and chuck holes). If a small crack occurs in the conduit, the exhaust gas is forced out by the internal pressure and the resulting corrosion together with normal vibration and flexure cause a rapid deterioration of the system. Another consideration is cost. An automobile is sold in an extremely competitive market where a manufacturer's survival may be determined by a few pennies of extra cost, per part. The cost in time and labor for installation or replacement of exhaust system parts can be another and similar limiting factor.

Accordingly, an object of this invention is to provide new and improved conduits.

Another object of this invention is to provide conduits for use in hostile environments where there is a substantial amount of vibration. Still another object of the invention is to provide conduits for use in systems where there are many sources of vibration, such as conduits for use in automotive exhaust systems.

In keeping with an aspect of the invention, these and other objects are accomplished by a convoluted conduit made from multi-ply coaxial layers of tubing or from a tape wrap, preferably using a plurality of long, ribbon-like, metal strips (such as stainless steel, carbon steel, brass, bronze, or various alloys), which are wound one over the other to make conduits with multi-layered walls. By selecting a proper configuration for the convolutions, the hose may be made self-damping so that it resists vibration and thereby sharply reduces metal fatigue. Depending upon the services to which the conduit may be put, a number of further materials or processing steps may be added. For example, the interfaces between at least the edges of the tape and localized paths at one or more interfaces of tubes may be brazed or may otherwise be bonded by non-metallic bonds (PTFE, elastomers, epoxies, or the like). Also, suitable gaskets, sealing, or bonding may be provided, often in random patterns, between adjacent layers to add damping characteristics and to seal against leaks.

Several embodiments of the invention for accomplishing these and other objects are shown in the attached drawings in which.

Figure 6:
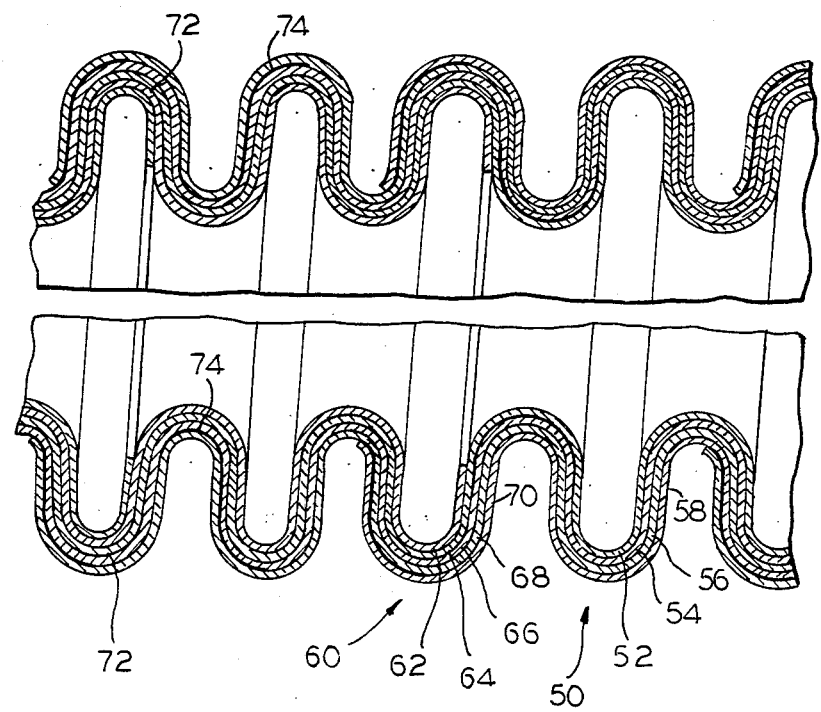
Figure 7:
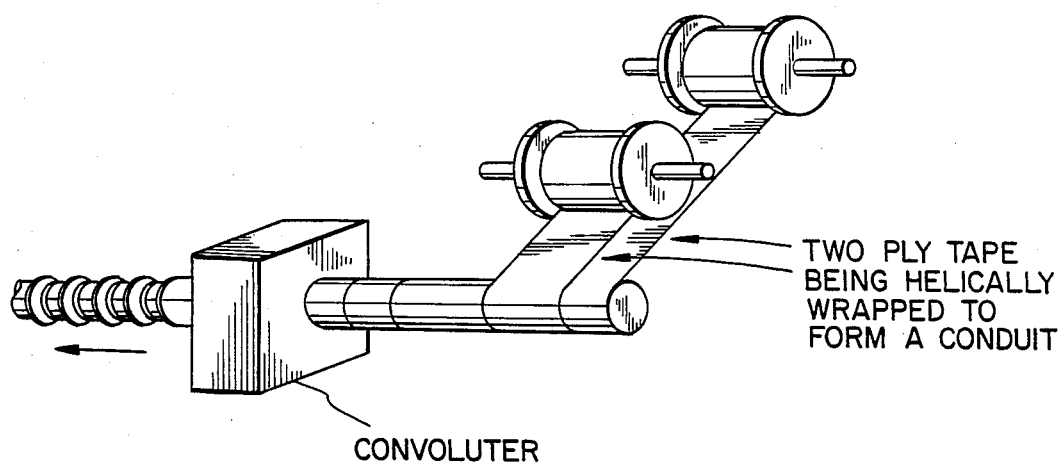

FIG. 6 is a similar cross-section showing a multi-wall wrapped conduit having variable plies and variable wall thickness, the interfaces between separate layers including, by way of example, several forms of metallic and non-metallic gaskets, sealing or bonding between adjacent layers forming the conduit; and FIG. 7 schematically shows an apparatus for laying down a plurality of tape layers and for thereafter convoluting the multi-layered tape walls.

The invention relates to convoluted conduits made by wrapping tape around a form. For example, BX cable used to provide electrical wiring in home construction has an armor coating which is a convoluted conduit made by wrapping a metal strip or tape around a form. Certain aircraft fuel lines provide examples of a non-metallic convoluted conduit. This type of fuel line is made by wrapping strips of "Teflon", layer on layer, and by wrapping a fiber glass tape on the outside of the resultant structure to form a tube or conduit. These and other conduits illustrate tape wrapped conduits similar to that contemplated by the invention.

This invention provides a flexible metal conduit assembly primarily for use with a high temperature transfer of fluids, such as the conduits used in engine exhaust systems, in steam lines, or in hot air lines that are subject to extreme vibration or flexure. In these and similar installations, there is a substantial movement between the ends of the assembly at both very low and very high frequencies, as a result of mechanical vibrations and of the related resonances, as well as from movements due to thermal expansion and contraction which occur during normal operational displacements of parts. For example, the conduit connecting the engine exhaust manifold to the catalytic converter of an automobile may be exposed to an extreme vibration and intermittently heavy resonance up to frequencies of 500 hertz and sometimes more. There may be offset movements in the order of one inch displacements in three planes due to mechanical vibration and expansion caused by exhaust gas at temperatures that may reach 1500° F. and more. Normally, these conduits are very tightly positioned in locations where relatively large hoses, which may be two or more inches in diameter, are restricted to lengths as short as seven or less inches. The fatigue problem is extreme and the restricted spaces demand novel solutions to provide the endurance and to enable the movements which are needed for long term service.

Very often the operating conditions or design requirements preclude the use of most plastics for making a conduit with sufficient flexure and endurance. For the types of applications described above, the conduit may be made from metallic convoluted tubing or tape which is wrapped to form convoluted tubing in a symmetrical and consistent form (FIG. 1) so that flexure stresses are spread uniformly throughout each convolution and over the entire length of conduit. The metal used to make the conduit is selected on a basis of chemical and thermal compatibility for the application. The thickness of the tube wall depends upon what is needed to resist the pressures anticipated during the intended service.

Figure 2A:
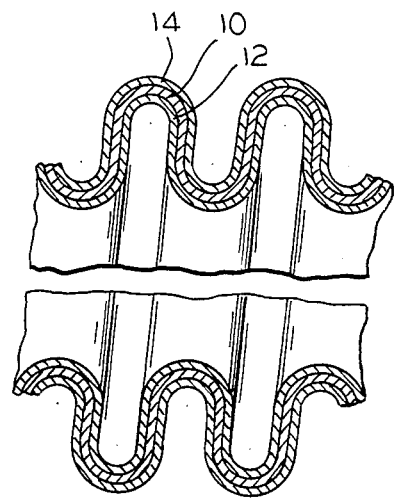
FIG. 2A is a similar cross-section of a conventional multi-wall conduit made from coaxial tubes.
Figure 2B:
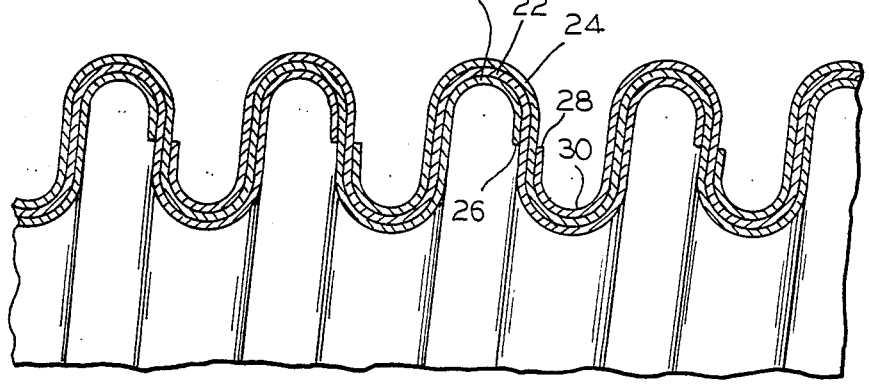
FIG. 2B is a similar cross-section of a conventional multi-wall tape wound conduit with symmetrical convolutions.

When the conduit must be more flexible than the convolutional geometry allows with a single wall thickness, multiple walls of thin, coaxial positioned tubes or metallic tape wound in multiple layers can be convoluted as shown in (FIG. 2) to reduce the force required to flex the conduit. FIG. 2A shows coaxial tubes and FIG. 2B shows multi-layers of tape. The unit stress on the metal is thus reduced so that the metal fatigue life is greatly improved. However, such a multi-layered conduit is more expensive than a single wall conduit.

When the anticipated service includes only a low level of vibration and cyclic flexure, the use of the multiple wall conduits together with a symmetric and consistent convolution form is a good solution for endurance against extreme fatigue. However, when severe and variable sinusoidal or random vibrations are also involved or when flexure is at very high frequency, the natural frequency and the consequences of resonance must be considered. In this case, the assembly with the multiple wall has a lower spring rate and thus has an inherently lower natural frequency, with a higher amplification factor, as compared with a stiffer single wall conduit of the same wall thickness and convolution configuration.

Natural vibration frequencies often fall in the normal operating frequency of the equipment, e.g. the normal RPM of an engine causes sympathetic resonant vibrations in the conduit. This operating frequency may cause the conduit to experience resonance under normal operating conditions. Worse still, in these ranges, the natural vibration frequency of the conduit may match the resonant frequency of the engine. The resultant super-imposing of resonance on resonance creates an extreme, cyclic load amplification that leads to a fatigue failure in a relatively short time. Hence, prior art devices such as those shown in FIGS. 1 and 2 have required some kind of external damping to prevent or inhibit this kind of self-destructive resonance.

One solution to the problem of a severe combination of vibration and flexure is to provide both multiple walls for flex endurance and a damping mechanism to reduce the amplitude and duration of the resonance vibrations. The damping might be provided by an external means used on or in connection with the conduit. However, the high operating temperature precludes the use of elastomers and the like on an exhaust system of an internal combustion engine. An external spring wrapped between or around the convolutions adds substantial cost. Thus, separate and external damping means are not usually a very good idea.

In both FIG. 2A and FIG. 2B, there is a conventional multi-layer tube having uniform wall thickness. In the case of FIG. 2A, three nesting tubes 10, 12, 14 are coaxially positioned inside each other, and then, all three are convoluted as a unit. In the case of FIG. 2B, three layers of tape 20, 22, 24 are wound one over the other in an alignment which keeps edges 26, 28 of the tape layers opposite each other. Therefore, when the next layer 30 begins, it picks up where layer 20 left off to maintain a uniform thickness.

Figure 1:
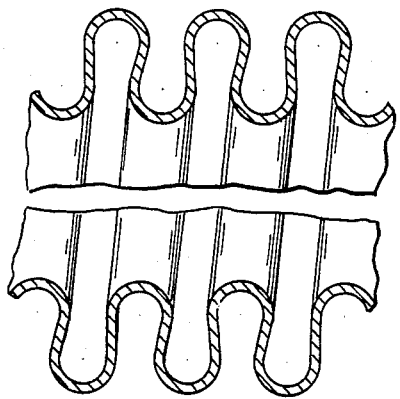
FIG. 1 is a partial cross-section of a conventional, non-self-damping symmetrical convoluted conduit made from a single wall of tape wound with a uniform annular or helical pitch.

All conduits, including those shown in FIGS. 1 and 2, have within themselves some inherent self-damping capabilities. However, conduits shown in FIGS. 3–6 that use non-symmetrical convolutions with a varying convolution form, height, spacing, plies, and wall thickness along the length of the conduit have much higher levels of self-damping. The convolution height, H, h, or the convolution thickness, T, t, or the convolution spacing, S, s, or any combination thereof, may be varied to significantly change the spring rate and the related natural frequencies between convolutions, and along incremental segment lengths of the conduit. Therefore, while some convolutions are experiencing an induced resonance, their neighboring convolutions, which have a different natural resonance frequency, do not synchronize with the convolutions which are then in resonance. In fact, adjacent convolutions tend to dampen the vibration of the nearby neighboring convolutions, thus making the entire conduit more self-damping.

The variations in convolution form are easily visualized and can be accomplished with machinery that convolutes multi-ply tubing or wraps one or more tapes at a time to form a multiple wall conduit, as shown in FIG. 7. The spring rate can be changed substantially more than 10%, by using the techniques illustrated in FIGS. 3 thru 6. The larger variations in spring rate between convolutions becomes necessary when the conduit is subjected to external loads or high operating pressures. These external forces raise the spring rate and resonant frequency of the conduit, and reduce the effect of the original "free state" spring rate variation which in turn, reduces the self-damping of the conduit. On the other hand, as the spring rate changes more and more between convolutions, the distribution of strain between adjacent convolutions becomes more disproportionate. Then, the conduit's ability to flex becomes impaired because most of the flexing occurs in those convolutions which have the lowest spring rate. Therefore, care must be taken so that the non-symmetry of convolutions is great enough to assure self-damping under anticipated operating conditions, but also, is small enough to maintain the greatest possible uniformity of flexing.

When the convolution form and variable plies (FIGS. 3, 4, and 5) alters the spring rate between convolutions, a use of concentric tubes to achieve multiple layers is practical, although it may be relatively expensive.

Figure 3:
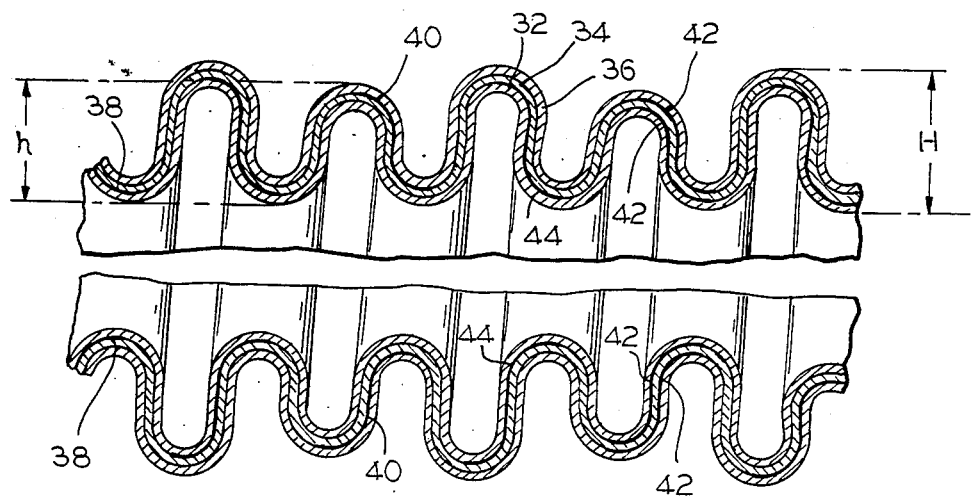
FIG. 3 is a similar cross-section showing the inventive self-damping, non-symmetrical, convoluted conduit made from multiple wall tubes or tape wound tubes with variable plies or variable height for the various convolutions, with layers bonded together in a random pattern to vary the wall thickness.
Figure 4:
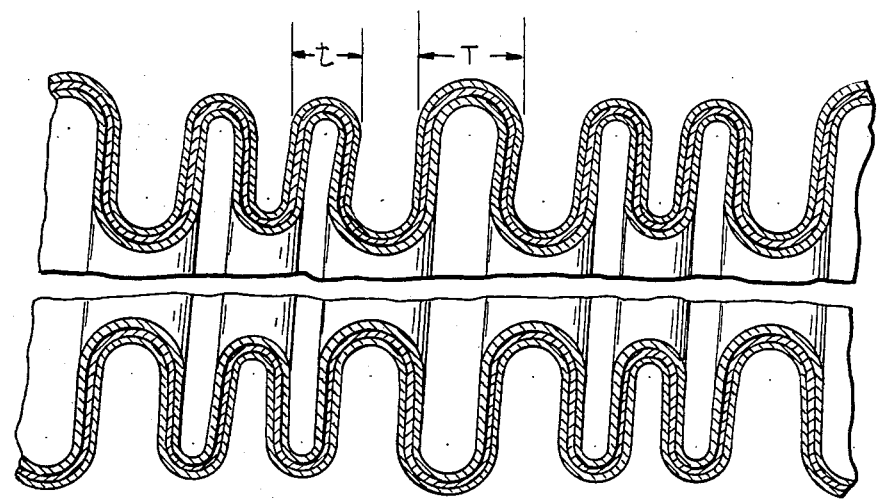
FIG. 4 is a similar cross-section of a conduit with annular or helical convolutions having variable plies, variable pitch and a variable height.
Figure 5:
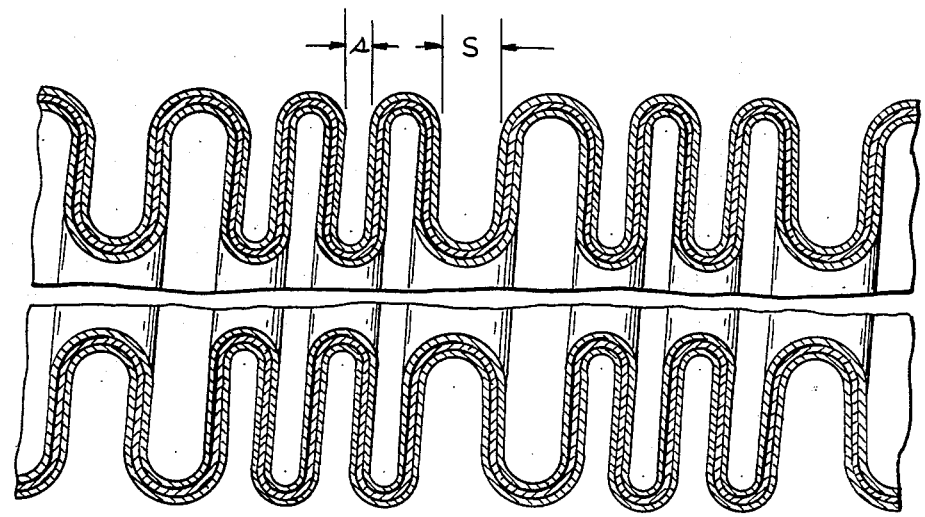
FIG. 5 is a similar cross-section with yet another form using variable plies and variable annular or helical spacing or pitch with uniform height.

FIG. 3 shows a tube which might be manufactured from either coaxially nesting tubes or multi-ply wound layers 32, 34, 36. At the interfaces between the several layers, there is a bonding in random patterns. For example, FIG. 3 has been drawn with a bonding (such as brazing) at the interface between the inner two layers, as shown at 38, 38. The brazing is shown between the outer two layers at 40, 40, and between both layers at 42, 42. The brazing at 40 is on the sloping side walls of the convolution. The brazing at 38, 38 is symmetrical at the crest of a hill or the root of a dale forming the convolution. The brazing at 44 is asymmetrical relative to the geometry of a convolution. These showings indicate that brazing may be used in random patterns to restrict uniformity of resonance in adjacent convolutions. The effect of the brazing is to make walls of variable thickness.

Another economical way to achieve a variation in spring rate between convolutions is to use a wrapped multi-layer structure (FIG. 6) with the wrapping tape overlapping itself in a non-uniform manner. The overlapping edges of the tape can be made to end on a convolution in a manner that gives a variation in the thickness of layers and, therefore, a variation in the spring rate between convolutions.

More particularly, FIG. 6 shows a design where every other convolution has either 4-layers or 5-layers at the root of the convoluted form. For example, at 50, there are four layers 52–58 of tape forming the wall of the conduit and, at 60, there are five layers 62–70 forming the wall of the conduit. By an inspection of FIG. 6, it should be apparent that each successive convolution has a different number of layers, thereby giving each convolution a thickness which varies as compared to the thicknesses of its neighboring convolutions. However, alternative arrangements may be used. For example, sometimes one-third of the convolutions may be thicker or thinner than the remaining two-thirds of the convolutions. There may also be a variation in the form between adjacent convolutions to further refine the spring rate and the related natural frequency, as taught by combinations of the principles shown in FIGS. 3–6. Further, changes of form may be achieved by applying disposable layers of filler material of varying thicknesses to the inside surface of the conduit. When this disposable material of variable thickness is removed after the conduit is formed, there is a variation in the form of the conduit.

The multi-layered conduit of FIG. 6 may be made into a sealed, bubble-proof conduit so that there is no passageway for enabling an escape of fluid from the conduit. One way of sealing the multi-layers of the tape is to provide a layer of gasket material on either the inside or the outside of the conduit by laying down a strip of the gasket material as either the first or the last wrap. The gasket material may be either metallic or non-metallic. The appropriateness of this approach depends in part upon the characteristics of the fluid inside the conduit, upon its corrosive effects and impact, and upon how thin the various tapes may be. With these considerations in mind, the tape thickness is selected to avoid creating mechanical problems.

Another approach for sealing the conduit is to provide a relatively soft solder which may be applied in a liquid phase as a wash to coat the inside of the conduit.

Still another way of sealing the conduit is to provide a brazing material between the layers of the multi-layer wrap, as by plating a surface of the primary metal (e.g. stainless steel) tape with a brazing material such as copper. Yet another way is to apply successive wraps of steel tape and copper tape, for example, in alternate layers. The brazing material may cover either the entire surface of the tape or part of the surface of the tape, such as at just the edges of the tape which make the wall of the conduit. The resulting conduit is then placed in a brazing furnace which melts the brazing material and bonds the confronting surfaces of the steel tape, thereby making a unitary conduit wall. When the interface is only partly bonded by brazing, the brazed versus non-brazed area create a variation in plies which cause a substantial change in the stiffness and spring rate between convolutions of the conduit.

A string 72 or a tape 74 of gasket or packing material may be interposed between adjacent layers of the metal tape. Since the metal tape is tightly wound into the conduit form, the packing material is compressed between the layers of the tape.

The concept is to make non-symmetrical convolutions that will be self-damping as a result of its unique design. A continuous, helically-wrapped tape is formed with or without metallic or non-metallic tape interlayers to help seal the multi-ply, non-uniform convoluted wall thickness that is self-damping. In many cases, the FIG. 6 method of varying the wall thickness is substantially less expensive than non-symmetrical convoluted multi-ply conduit. In any of its many forms, a principal advantage of the multi-ply conduit is that it may be made with bubble tight seams, even at very high internal pressures.

For exhaust systems which operate at low pressures, when either tape-formed or tube-formed multi-ply non-symmetrical convoluted metal hose do not have to be bubble tight, the use of the non-symmetrical, wrapped form is preferred. In each case, adjacent convolutions are self-damping under resonance conditions. The choice of design depends upon the operating conditions and upon the economics for the application.

Concentric multi-ply tubes with brazing tape wrapped between tube interfaces create a variable ply geometry between convolutions. Wherever the surface between two tubes is brazed, the structure behaves as though the two bonded plies are, in fact, one wall thickness. Thus, bonding changes the thickness considerably.

Those skilled in the art will readily perceive how to modify the invention without departing from the scope or spirit thereof. Therefore, the appended claims are to be construed to cover all equivalent structures.

What is claimed is:

1. A metallic convoluted fluid conveying conduit for use in an exhaust system of an automotive vehicle, said vehicle causing certain vibrational characteristics which would tend to establish localized high energy loops and nodes in said conduit at various resonant frequencies resulting from an operation of said vehicle, said conduit comprising a plurality of coaxial layers forming a multi-layered convoluted wall of alternating peaks and valleys, the conduit having a mass and a spring rate which determines the nature of the conduit response to said vibrational characteristics, the layers being arranged to provide a conduit wall comprised of successive incremental lengths, each incremental length of said wall having a thickness which is variable relative to the thickness of neighboring incremental lengths in order to vary said mass and said spring rate to produce localized vibration response characteristics which do not coincide with said localized high energy loops and nodes, whereby successive incremental areas of said conduit have different resonant characteristics responsive to said certain vibrations, and said variations in thickness being distributed along the length of said conduit to inhibit localized resonance in said conduit at said resonant frequencies of said vehicle.

2. The convoluted conduit of claim 1 wherein said coaxial layers are formed by successive layers of tape, the width and locations of said tape being such that a different number of layers is formed on each adjacent convolution, whereby there is a variable thickness of the conduit wall.

3. The convoluted conduit of claim 2 wherein there are two different types of differing wall thicknesses, each of first alternate ones of said convolutions having one of said two thicknesses and each of second alternate ones of said convolutions having the other of said two thicknesses, whereby convolutions of said one and said other thicknesses interleave with each other.

4. The convoluted conduit of claim 1 and sealing means interposed between at least some of said plurality of layers for sealing together the layers of the wall of said conduit, thereby making the wall of said conduit behave as a single wall thickness in the areas where said sealing means is interposed, said areas of sealing being selected on a basis of the localized vibrational characteristics of said conduit in said vehicle in order to provide said variations in thickness along the length of said conduit.

5. The convoluted conduit of claim 4 wherein said sealing means is a gasket packing material.

6. The convoluted conduit of claim 4 wherein said coaxial layers are tape and said sealing means is a brazing material interposed between layers of said tape in at least some locations.

7. The convoluted conduit of claim 6 wherein said coaxial layers are tape and said brazing material is a plating on said tape which is melted in a brazing furnace after said conduit is completed.

8. The convoluted conduit of claim 6 wherein said coaxial layers are tape and said brazing material is a tape which is wound between adjacent layers forming said convoluted wall.

9. The convoluted conduit of claim 6 wherein said coaxial layers are tape and said brazing material covers the entire surface of said tape.

10. The convoluted conduit of claim 6 wherein said coaxial layers are tape and said brazing material covers the confronting edges of said tape.

11. The convoluted conduit of claim 6 wherein said coaxial layers are tape and said brazing material covers only part of the surface of the tape in a manner that creates variable plies between convolutions.

12. The convoluted conduit of claim 1 wherein said coaxial layers are formed by tubes coaxially nesting inside each other, and means located at the interfaces between said tubes for locally varying the thickness of the conduit whereby said conduit has said incremental areas of said different resonant characteristics.

* * * * *